US006894976B1

(12) United States Patent
Banga et al.

(10) Patent No.: US 6,894,976 B1
(45) Date of Patent: May 17, 2005

(54) PREVENTION AND DETECTION OF IP IDENTIFICATION WRAPAROUND ERRORS

(75) Inventors: Gaurav Banga, Sunnyvale, CA (US); Henk J. Bots, Hollister, CA (US); Mark Smith, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 943 days.

(21) Appl. No.: 09/595,599

(22) Filed: Jun. 15, 2000

(51) Int. Cl.$^7$ .............................................. H04L 12/26
(52) U.S. Cl. ..................... 370/235; 370/244; 370/474
(58) Field of Search ................................ 370/235, 236, 370/241, 242, 244, 250, 395.1, 395.2, 395.21, 395.51, 395.52, 466, 468, 469, 473, 474

(56) References Cited

U.S. PATENT DOCUMENTS

| | | | | |
|---|---|---|---|---|
| 4,937,763 | A | | 6/1990 | Mott ........................... 364/550 |
| 5,067,099 | A | | 11/1991 | McCown et al. ........... 364/550 |
| 5,754,754 | A | * | 5/1998 | Dudley et al. ................ 714/18 |
| 5,931,916 | A | * | 8/1999 | Barker et al. ............... 709/239 |
| 6,247,058 | B1 | * | 6/2001 | Miller et al. ................ 709/234 |
| 6,519,223 | B1 | * | 2/2003 | Wager et al. ............... 370/216 |
| 6,621,796 | B1 | * | 9/2003 | Miklos ........................ 370/236 |

FOREIGN PATENT DOCUMENTS

EP          0537098          4/1993

* cited by examiner

Primary Examiner—Kwang Bin Yao
(74) Attorney, Agent, or Firm—Swernofsky Law Group PC (57) ABSTRACT

A method of generating IP identification numbers for IP datagrams. A plurality of IP identification number generators are maintained. A plurality of receiving stations are associated with the plurality of IP identification number generators such that each receiving station has an IP identification number generator associated therewith. An IP identification number is generated for a datagram sent to a receiving station based on an output of the associated IP identification number generator. Also, a method of reducing a likelihood of misassembly of received data fragments from fragmented IP datagrams. The data fragments have an IP identification number. All received data fragments of the datagram are discarded upon detection of receipt of an overlapping data fragment having the IP identification number. Timeouts for reassembling datagrams are reduced. First, timeouts for reassembling the datagrams are reduced to less than a standard timeout. Second, timeouts are reduced upon detection of a gap in the received data fragments. Third, timeouts are reduced upon detection of a datagram having the same protocol identification number and source address, but having a different IP identification number. Furthermore, a method of detecting a likelihood of misassembly of data fragments from fragmented IP datagrams. Communication errors between a sending station and a receiving station are detected. A rate is determined at which an IP identification number generator associated with the receiving station wraps around. NFS re-transmissions are determined. Based on one or more of these, a likelihood of misassembly at the receiving station is determined to be high.

13 Claims, 7 Drawing Sheets

PREVENTION AND DETECTION OF IP IDENTIFICATION WRAPAROUND ERRORS

BACKGROUND OF THE INVENTION

1. Field of the Invention

This invention relates to reassembly of data fragments of fragmented datagrams in a communication system. In particular, the invention relates to reducing and/or detecting a likelihood of misassembly of data fragments in a communication system utilizing the Internet Protocol (IP) caused by IP identification wraparound.

2. Description of the Related Art

The Internet Protocol (IP) has become one of the most widely used communication protocols in the world. IP is part of a layered protocol, which means that another higher level protocol typically uses IP for data communication. Examples of such higher level protocols are the Transfer Control Protocol (TCP) and the User Datagram Protocol (UDP). In addition, even higher level protocols are sometimes utilized, such as the Network File System (NFS). These protocols are well known to those skilled in the art. The protocols are used to send data from a sending station (e.g., a client or a server on a sending end of a communication) to a receiving station (e.g., a client or a server on a receiving end of a communication), possibly through one or more routing devices that form an IP path.

In order to send a TCP, UDP or other protocol datagram across an IP connection, the datagram is encapsulated in an IP datagram. Often, the IP datagram must be fragmented into plural IP data fragments in order to be sent using the physical network. For example, if a size of the datagram exceeds the physical link's maximum transfer unit (MTU), that datagram must be fragmented into plural IP data fragments with sizes that do not exceed the MTU. Then, a receiving station reassembles the data fragments into the datagram.

A receiving station determines that data fragments belong to a single IP datagram by looking at an IP identification number in a header of each data fragment. All data fragments from the same IP datagram share the same IP identification number. In addition, the header of each data fragment includes an offset from the start of the datagram, a length of the data fragment, and a flag that indicates whether or not the datagram includes more data fragments. This information is sufficient for reassembly of the IP datagram, which includes the original TCP, UDP or other protocol datagram.

According to IP, the IP identification number is 16 bits long with a range of 0 to 65535. A sending station conventionally uses a simple counter to determine the IP identification number for each IP datagram. In the early days of IP communications, a receiving station most likely would receive all data fragments of a datagram with a particular IP identification number and reassemble the datagram well before this counter could wrap around. If a data fragment was lost, thereby making reassembly of a datagram impossible, all received data fragments of that datagram would be discarded after a timeout of 64 seconds. With the slower communications times that existed in the early days of the IP communications, this timeout was usually sufficient to ensure data fragments would be discarded before the counter at the sending station could wrap around.

However, today's Internet communications are much faster. Gigabit and 100 Mb Ethernet implementations are commonplace, and faster implementations are constantly being developed. As the communications speed increases, the number of IP datagrams sent by a sending station per unit of time also increases. Thus, the simple 16-bit counter conventionally used to generate IP identification numbers wraps around much more quickly. In fact, in a high speed setting, the counter can almost be guaranteed to wrap around within 64 seconds. Thus, a receiving station can receive data fragments from two different IP datagrams that share a common IP identification number before a first one of those datagrams is reassembled.

Because of the nature of IP communications, it is possible for a data fragment from a second one of two datagrams to arrive at the receiving station before a corresponding data fragment from a first one of the two datagrams. Then, if the two datagrams share a common IP identification number due to wraparound of the sending station's IP identification number counter, the receiving station can misassemble the data fragments. This misassembly can result in corruption of the datagram.

For example, if first datagram A is fragmented into data fragments A1, A2, A3, A4 and A5, and second datagram B is fragmented into data fragments B1, B2, B3 and B4, it is possible for a receiving station to receive the data fragment B2 before data fragment A2. Then, if datagram A and datagram B share a common IP identification number due to wraparound of the sending station's IP identification number counter, the receiving station can misassemble data fragments A1, B2, A3, A4 and A5 into a datagram, which of course would not contain the proper data.

Higher level protocols such as TCP and UDP utilize checksums and length checks in an attempt to catch such data corruption. However, the UDP checksum is only 16 bits long. It has been found that in a high speed environment, IP misassembly errors might occur with sufficient frequency that eventually a "false positive" checksum can result. In this case, the checksum can indicate that the UDP datagram has been properly reassembled, while in fact the datagram has been corrupted. Other properties of conventional IP exacerbate this situation, such as IP's acceptance of overlapping data fragments during datagram reassembly. In a UDP communication setting, these types of errors can lead to undetected data corruption. This data corruption might only come to light when the data is actually utilized, a situation that preferably should be avoided.

SUMMARY OF THE INVENTION

The invention addresses the foregoing concerns by implementing measures designed to reduce a likelihood of misassembly of received data fragments from fragmented IP datagrams. In addition, the invention implements measures designed to detect when a likelihood of such misassembly is high so that appropriate corrective policies can be implemented.

One embodiment of an aspect of the invention is a method of generating IP identification numbers for IP datagrams. In this embodiment, a plurality of IP identification number generators is maintained. A plurality of receiving stations are associated with the plurality of IP identification number generators such that each receiving station has an IP identification number generator associated therewith. An IP identification number for a datagram sent to one of the receiving stations is generated based on an output of the associated IP identification number generator. This method preferably is performed by an IP layer of a sending station's communication system.

By using plural number generators, this aspect of the invention slows down wraparound of IP identification numbers used for communication with any given receiving station.

Preferably, each of the IP identification number generators has at least one receiving station associated therewith. At least one of the IP identification number generators preferably has plural receiving stations associated therewith. In one embodiment, the plurality of IP identification number generators forms an array of number generators such as 16-bit counters. Preferably, the plurality of IP identification number generators is associated with the plurality of receiving stations by hashing destination addresses for the receiving stations and, in one embodiment, protocols for transmitting to those receiving stations so as to form an index to the array. If the hashing includes protocol information, the hashing preferably is performed such that at least half of the number generators in the array are associated with UDP protocol communications.

An embodiment of another aspect of the invention is a method of reducing a likelihood of misassembly of data fragments from fragmented IP datagrams. In this method, data fragments of a datagram having an IP identification number are received. All received data fragments of the datagram are discarded upon detection of receipt of an overlapping data fragment having the IP identification number, wherein the overlapping data fragment overlaps data in an already-received data fragment. The overlapping data fragment can overlap all or less than all of the already-received data fragment(s). This method preferably is performed by an IP layer of a receiving station's communication system.

An embodiment of another aspect of the invention also is a method of reducing a likelihood of misassembly of data fragments from fragmented IP datagrams. According to this method, a timeout for reassembling the datagrams is reduced to less than a standard timeout. Preferably, the datagram reassembly timeout is reduced to 45 seconds from the standard timeout of 64 seconds. Alternatively, the datagram reassembly timeout is dynamically reduced based on NFS data for round-trip times between a sending station and a receiving station. This method preferably is performed by an IP layer of a receiving station's communication system.

Yet another aspect of the invention is embodied in a method of reducing a likelihood of misassembly of data fragments from fragmented IP datagrams. This method includes the steps of receiving data fragments of a datagram having an IP identification number, and reducing a remaining time for reassembling the datagram upon detection of a gap in the received data fragments. Preferably, the remaining time for reassembling the datagram is reduced to eight seconds. This method also preferably is performed by an IP layer of a receiving station's communication system.

An additional aspect of the invention is embodied in another method of reducing a likelihood of misassembly of data fragments from fragmented IP datagrams. According to this method, data fragments of a first datagram are received, with the data fragments each having a protocol identification number, a source address, and a first IP identification number. A remaining time for reassembling the datagram is reduced upon detection, before receipt of a last data fragment of the first datagram, of a data fragment of a second datagram having the protocol identification number and the source address but having a second IP identification number. Preferably, the remaining time for reassembling the datagram is reduced to eight seconds. This method also preferably is performed by an IP layer of a receiving station's communication system.

A further aspect of the invention is embodied in a method of detecting a likelihood of misassembly of data fragments from fragmented IP datagrams. In this embodiment, communication errors between a sending station and a receiving station are detected. The likelihood of misassembly is determined to be high upon detection that the communication errors occur at a high rate for a predefined period of time. The communication errors that are detected can include communication errors detected by an IP layer of the receiving station's communication system. Such IP communication errors include, but are not limited to, receipt of overlapping data fragments and IP datagram reassembly timeout errors. The communication errors that are detected also can include communication errors detected by a UDP layer of the receiving station's communication system. Such UDP communication errors include, but are not limited to, UDP length errors and UDP checksum errors. The communication errors that are detected also can include communication errors detected by an NFS layer of the sending station's communication system.

Preferably, upon detection that the likelihood of misassembly is high, policies are implemented to reduce the likelihood of misassembly of data fragments. Examples of implementations of such policies include, but are not limited to, preferentially using TCP instead of UDP, using additional checksums and presenting a warning message to a system administrator.

Another aspect of the invention is embodied in a method for a sending station to detect a likelihood of misassembly at a receiving station of data fragments from fragmented IP datagrams. This method includes the steps of determining a rate at which an IP identification number generator associated with the receiving station wraps around, and determining that the likelihood of misassembly at the receiving station is high upon determination that the IP identification number generator wraps around at faster than a predetermined rate. Preferably, the predetermined rate is once every ninety seconds. Alternatively, NFS re-transmissions also are considered when determining if a likelihood of datagram misassembly is high.

Policies are preferably implemented to reduce the likelihood of misassembly of data fragments upon determining that the likelihood of misassembly is high. Examples of such policies include, but are not limited to, preferentially using TCP instead of UDP, using additional checksums, and presenting a warning message to a system administrator. When the sending station maintains plural IP identification number generators, such policies also can include reducing a number of receiving stations associated with the IP identification number generator that is wrapping around at faster than the predetermined rate.

Each of the foregoing methods can be used in conjunction with the others in various combinations to reduce and/or to detect a likelihood of misassembly of IP datagrams. The invention also includes apparatuses such as sending and receiving stations configured to perform the foregoing methods, computer readable code by itself or embodied in a computer program product to cause a computer to perform the foregoing methods, and a memory storing information including instructions executable by a processor to perform the foregoing methods.

This brief summary has been provided so that the nature of the invention may be understood quickly. A more complete understanding of the invention may be obtained by reference to the following description of the preferred embodiments thereof in connection with the attached drawings.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors or special purpose processors adapted to particular process steps and data structures operating under program control, that such process steps and data structures can be embodied as information stored in or transmitted to and from memories (e.g., fixed memories such as DRAMs, SRAMs, hard disks, caches, etc., and removable memories such as floppy disks, CD-ROMs, data tapes, etc.), with the information including instructions executable by such processors (e.g., object code that is directly executable, source code that is executable after compilation, code that is executable through interpretation, etc.), and that implementation of the preferred process steps and data structures described herein using such equipment and structures would not require undue experimentation or further invention.

Figure 1:
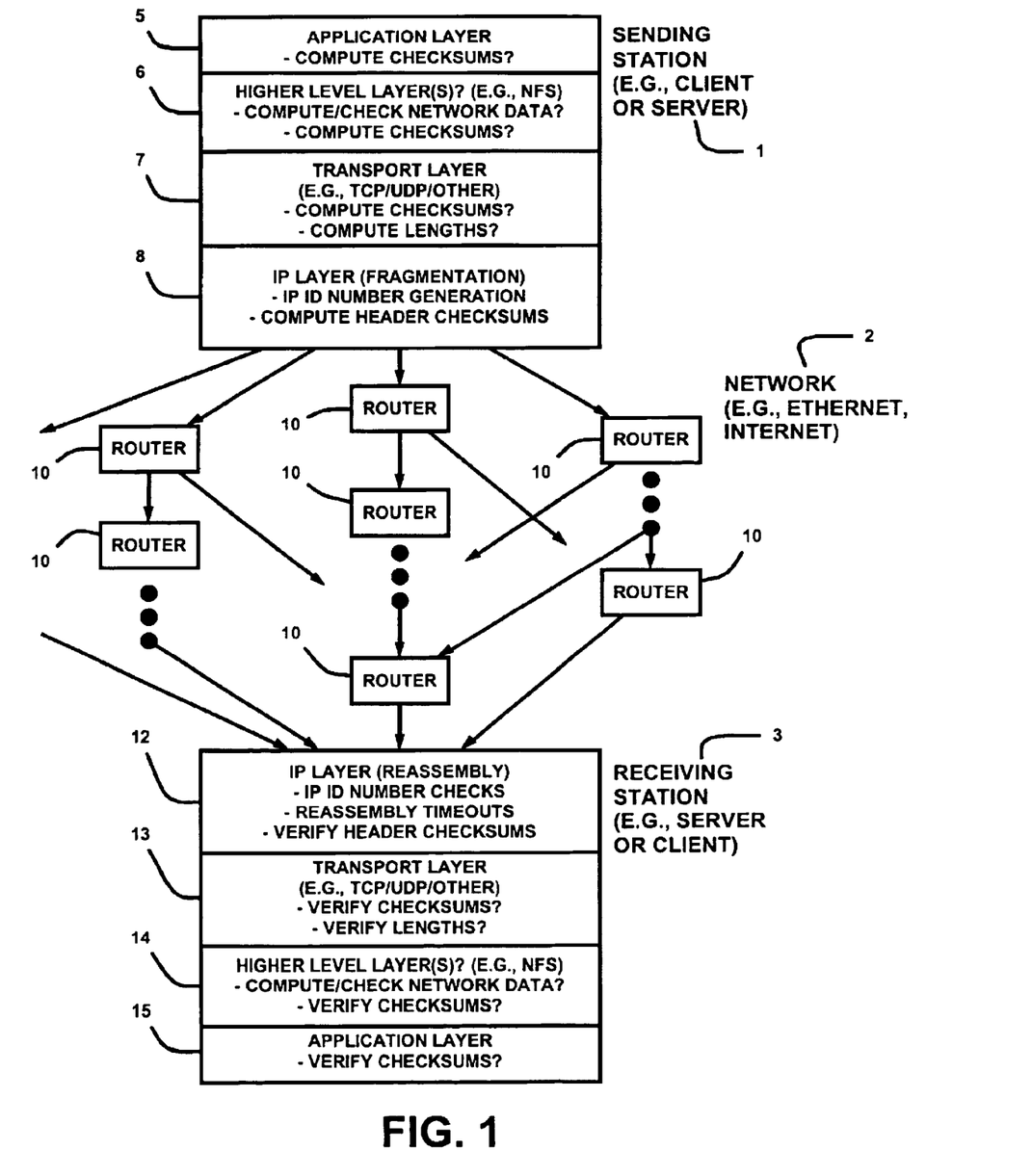
FIG. 1 is a representational view of communication between a sending station and a receiving station across a network such as the Internet.

FIG. 1 is a representational view of communication between a sending station and a receiving station across a network such as the Internet. In FIG. 1, sending station 1 sends information across network 2 to receiving station 3.

Sending station 1 can be a client sending data to a server, a server sending data to a client, or any other device or entity sending data across network 2. Likewise, receiving station 3 can be a server receiving data from a client, a client receiving data from a server, or any other device or entity receiving data across network 2.

A single device, such as a client or a server, can be both a sending station and a receiving station, possibly simultaneously. For example, in typical two-way data communications between a client and a server, the client is a sending station for communications sent to the server and a receiving station for communications received from the server. Likewise, the server is a receiving station for communications received from the client and a sending station for communications sent to the client.

Sending station 1 communicates through a layered communication protocol. Preferably, the layered communication protocol includes application layer 5, higher level layer 6 such as a Network File System (NFS) layer, transport layer 7 such as a Transfer Control Protocol (TCP) layer, User Datagram Protocol (UDP) or other protocol layer, and Internet Protocol (IP) layer 8. Various other combinations of layers are possible. For example, some sending stations do not have higher level layer 6. Also, particular types of layers are designed to work with other types of layers. For example, NFS was originally designed to work with UDP, not TCP. Finally, some applications directly utilize the lower level UDP or IP layers, thereby bypassing much of the error checking (e.g., checksum computations) provided by the higher level and application layers. As data passes through each of the layers from an application program, each layer performs operations on the data such as encapsulation.

Application layer 5 provides an interface for application programs to send data. Application layer 5 might compute and add a checksum to the data. Such a checksum is useful for ensuring data integrity at a receiving station. However, the application layer does not have to use any such checksum.

Higher level layer 6 such as an NFS layer typically keeps track of network data. This layer also can add a checksum, although such is not mandatory.

Transport layer 7 packages data in datagrams. Each datagram typically includes a header and data. The data may be of various lengths. The header typically includes source and address information, datagram length, and a checksum. For example, UDP specifies that a UDP datagram has a header with a 16 bit source port number, a 16 bit destination port number, a 16 bit UDP length, and a 16 bit checksum. The checksum is for both the datagram's header and data, as well as for a pseudo-header that includes additional information (IP source address, IP destination address, protocol, and datagram length).

IP layer 8 encapsulates UDP, TCP or other protocol datagrams into IP datagrams in order to send those datagrams across network 2. Often, an IP datagram must be fragmented into plural IP data fragments in order to be sent across network 2. For example, if a size of the datagram exceeds a known maximum transfer unit (MTU) for network 2, that datagram must be fragmented into plural IP data fragments with sizes that do not exceed the MTU.

IP layer 8 generates an IP identification number for each IP datagram. All data fragments from the same IP datagram share the same IP identification number. In addition, the header of each data fragment includes an offset from the start of the datagram, a length of the data fragment, and a flag that indicates whether or not the datagram includes more data fragments. This information is sufficient for a receiving station to reassemble the IP datagram, which includes the original TCP, UDP or other protocol datagram. IP datagrams also include a checksum, but only for the header information.

According to IP, the IP identification number is 16 bits long with a range of 0 to 65535. In a high-speed communications setting, a conventional sending station might send many more than 65535 datagrams in a short period of time, causing this IP identification number to wrap around quickly. Thus, a sending station might send data fragments from two different datagrams with the same IP identification number to the same receiving station. This duplicate IP identification number can cause the receiving station to try to misassemble some of these data fragments into a single datagram.

In a setting where only a UDP data checksum is used to verify data integrity (e.g., an application checksum is not used or is bypassed and TCP is not used), some of these misassembled datagrams can slip through the weak 16 bit UDP checksum. This problem is exacerbated by the fact that the UDP checksum's strength is data-type dependent, resulting in similar checksums for similar types of data. For example, a corrupt datagram resulting from misassembly of mismatched text data fragments has better than a 1:65535 chance of resulting in a checksum that matches the checksum for the original datagram.

In order to reduce a likelihood of wraparound of IP identification numbers for datagrams sent to a particular receiving station, an IP layer according to the invention utilizes plural IP identification number generators, as discussed below with respect to FIG. 2.

In order to help determine when a likelihood of misassembly of datagrams is high, a sending station according to the invention can monitor for a high rate of communication errors that might be the result of datagram misassembly, as discussed below with reference to FIG. 8. The sending station also can monitors the IP identification number generator(s) for rapid wraparound, as discussed below with reference to FIG. 9.

Returning to FIG. 1, network 2 preferably includes a plurality of routers 10. Examples of network 2 include the Internet, an intranet, an Ethernet network, and any other network or virtual network that utilizes IP communications. The particular configuration of network 2 is representational only of the inclusion of many routers and many possible communication paths through network 2. This configuration has no other significance, and any other configuration that allows communications through network 2 can be utilized with the invention. For example, network 2 could be replaced with a single router 10 between sending station 1 and receiving station 3.

Each of routers 10 can have an MTU smaller than the sizes of data fragments sent to that router. If a router receives a data fragment larger than the router's MTU, the router can further fragment the data fragment. Each data fragment of a datagram can take a different path through network 2. The routers along these different paths can have different MTUs. Thus, data fragments of a single datagram received by a receiving station can have different sizes.

Receiving station 3 also communicates through a layered communication protocol. Preferably, the layered communication protocol includes layers corresponding to layers in sending stations that might send data to the receiving station. Thus, in FIG. 1, the layered communication protocol of receiving station 3 includes IP layer 12, transport layer 13 such as a TCP, UDP or other protocol layer, higher level layer 14 such as an NFS layer, and application layer 15. Various other combinations of layers are possible, and some applications directly utilize the lower level UDP or IP layers, thereby bypassing much of the error checking (e.g., checksum verifications) provided by the higher level and application layers. As data passes through each of the layers to an application program, each layer performs operations on the data such as decapsulation.

IP layer 12 reassembles data fragments into datagrams based on IP identification numbers, length data and flags in the headers of those data fragments. Reassembly time for a datagram is limited by a timeout. If datagram reassembly time from when a first data fragment of a datagram is received exceeds the timeout, all data fragments associated with the datagram are discarded.

IP layer 12 also verifies a header checksum for received unfragmented datagrams and data fragments, but this checksum only verifies the integrity of the associated IP headers. This checksum therefore does not generally help prevent or detect data fragment misassembly, at least because such misassembly can occur with completely self-consistent IP headers.

In order to reduce a likelihood of misassembly of data fragments from different datagrams that have the same IP identification number, an IP layer of a receiving station according to the invention can take several actions. The IP layer can discard all data fragments of a datagram if an overlapping data fragment is received, as discussed below with reference to FIGS. 3 and 4. The IP layer also can reduce a timeout for datagram reassembly. The overall timeout can be reduced, as discussed below with reference to FIG. 5. In addition, the time for reassembly can be dynamically reduced if a gap is detected in received data fragments of a datagram, as discussed below with respect to FIG. 6, or if a data fragment from another datagram with a different IP identification number is received from the same source with the same protocol, as discussed below with respect to FIG. 7.

In order to help determine when a likelihood of misassembly of datagrams is high, a receiving station according to the invention can monitor for a high rate of communication errors that might be the result of datagram misassembly, as discussed below with reference to FIG. 8.

Transport layer 8 strips the TCP, UDP or other protocol header off of a datagram, as appropriate. Both TCP and UDP can verify a checksum for the resulting data. However, as noted above, the UDP checksum is relatively weak. It should be noted that the TCP checksum also is not perfect. Corrupt data sometimes passes the TCP checksum, albeit with significantly less frequency than with the UDP checksum.

The length of the datagram preferably also is verified by the transport layer. However, many length errors are corrected in the IP layer's datagram reassembly. For example, a 750 byte data fragment inserted into a space for a 500 byte data fragment during datagram reassembly typically will not result in a UDP or TCP length error because the IP layer truncates overlong data fragments. Thus, length error checking also may not help catch datagram misassembly.

Higher level layer 14 preferably works in conjunction with higher level layer 6 in sending station 1 to keep track of and to manage network data. Higher level layer 14 also can provide data integrity verification through checksums, although use of such checksums is not mandatory.

Application layer 15 provides an interface for an application program to receive data. This layer also optionally can provide a checksum and error checking.

As is evident from the discussion above, many layers of an layered protocol used for network communications can provide checksums and other error detection measures. However, one common method for network communications is to have application programs directly communicate using UDP and IP. The only data checksum in this configuration is the UDP checksum, which is weak enough that it might miss some misassembly of data fragments. The invention provides techniques for decreasing the likelihood of such misassembly, as well as for detecting when a likelihood of misassembly is high.

Figure 2:
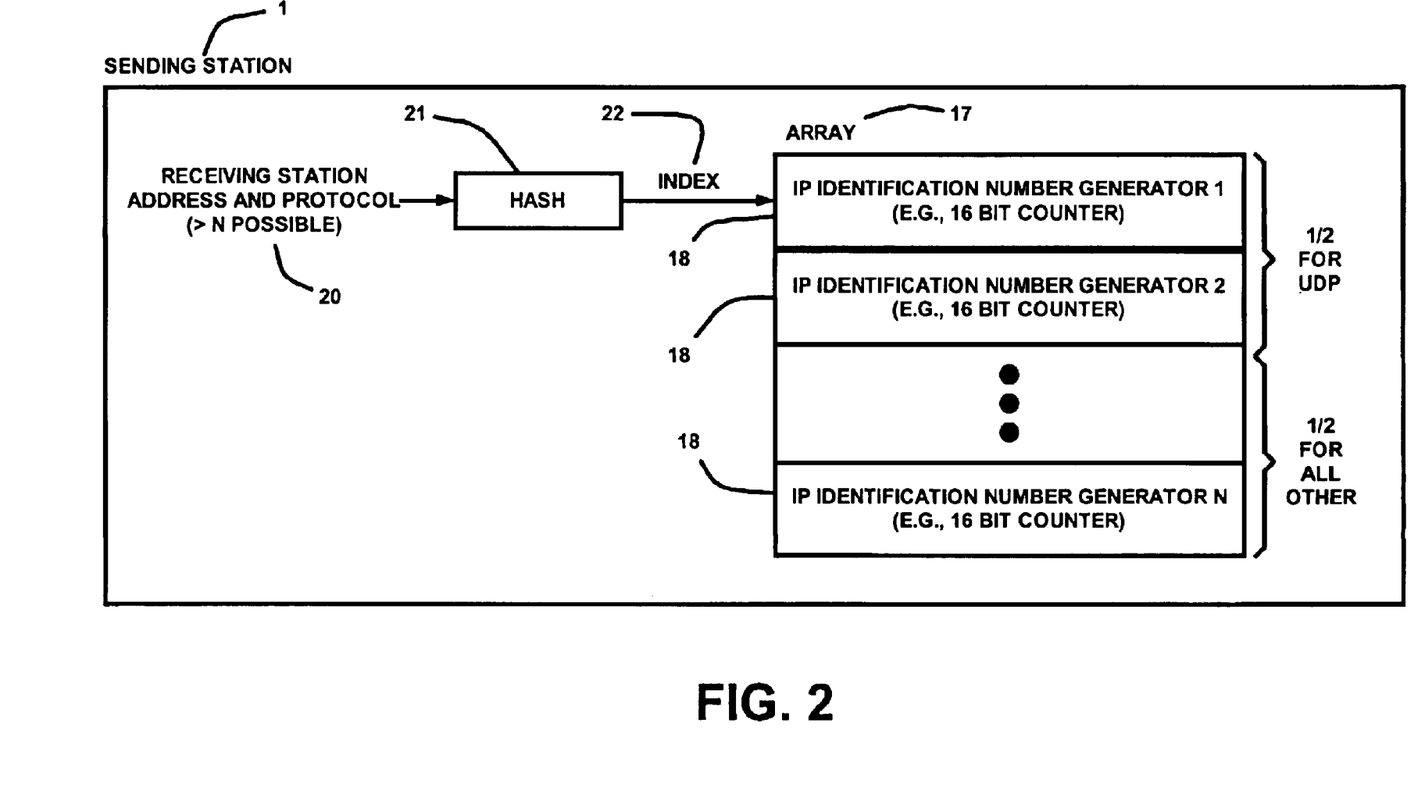
FIG. 2 is a representational view of a sending station using plural identification number generators to generate IP identification numbers.

FIG. 2 is a representational view of a sending station using plural identification number generators to generate IP identification numbers.

Briefly, IP identification numbers for IP datagrams are generated. To generate these identification numbers, a plurality of IP identification number generators are maintained. A plurality of receiving stations are associated with the plurality of IP identification number generators such that each receiving station has an IP identification number generator associated therewith. An IP identification number is generated for a datagram sent to one of the receiving stations based on an output of the associated IP identification number generator. Preferably, the IP identification numbers are generated in an IP layer of a sending station's communication system.

In more detail, FIG. 2 shows sending station 1 with array 17 of N plural IP identification number generators 18. N preferably is a power of two to simplify indexing and hashing, which are discussed below. Examples of N are 16 and 256. Each of IP identification number generators 18 preferably is a 16-bit counter, corresponding to the 16 bits needed for an IP identification number.

In order to associate a receiving station with an IP identification number generator, sending station 1 preferably uses the receiving station's address. Optionally, sending station 1 also uses the protocol for a particular datagram to be sent to that receiving station. Preferably, the datagram's transport protocol (i.e., TCP, UDP or other protocol) is used for this protocol. As shown in FIG. 2, receiving station address and protocol 20 for a datagram are hashed by hash 21 to form index 22 to array 17.

In the preferred embodiment, there are more than N possible combinations of receiving station addresses and protocols. In fact, sending station 1 may send data to more than N separate receiving stations. Therefore, more than one receiving station can be associated with each of IP identification number generators 18.

Hash 21 preferably is designed so that IP identification number generators 18 are distributed fairly evenly among the receiving stations. Preferably, if there are more than N receiving stations, each of plural IP identification number generators 18 has at least one receiving station associated therewith.

Furthermore, because UDP tends to be more susceptible to datagram misassembly than other transport protocols, hash 21 preferably is designed so that half of IP identification number generators 18 are associated with UDP. The other half of IP identification number generators 18 preferably are associated with all other protocols. Thus, each receiving station preferably will have an IP identification number generator associated therewith for UDP datagrams and an IP identification number generator associated therewith for all other protocol datagrams. This feature of hash 21 can be implemented by including a "UDP/non-UDP" bit in hash 21.

Whenever sending station 1 needs to send an IP datagram to a receiving station, sending station 1 preferably sends receiving station address and protocol 20 for that datagram through hash 21 to form index 22. Index 22 is then used to index to one of the plural IP identification number generators 18, which provides the identification number and then increments (or vice versa).

By virtue of the foregoing arrangement, a single IP identification number generator is not shared among all receiving stations. Rather, each of plural IP identification number generators is shared only among the associated receiving station/protocol combinations. Wraparound of IP identification numbers for datagrams sent to a particular receiving station using a particular protocol thereby tends to be greatly slowed, reducing a likelihood that data fragments from two datagrams having the same IP identification number will be sent to the same receiving station before reassembly timeout.

FIGS. 3 to 6 are representational views that illustrate various techniques by which a receiving station can further reduce a likelihood of misassembly of data fragments from two different datagrams. In each of these figures, a data fragment is represented by a small box. A letter in the box represents a datagram to which the data fragment belongs, and a number in the box represents the data fragment's position in the datagram. A small numeral to the upper right of each box indicates an order in which the data fragments have been received by the receiving station in each illustrated example. A data fragment that has not been received does not have such a numeral and is designated by a broken outline (see, e.g., data fragment A2 in FIG. 3). Finally, a numeral under each data fragment indicates a size of the data fragment in bytes.

It should be noted that the details shown in FIGS. 3 to 6, such as specific orders, sizes and compositions of data fragments and datagrams, are provided solely to clarify aspects of the invention discussed with respect to each figure and are for illustrative purposes only. The invention is in no way limited to those particular details, as will be apparent to one skilled in the art.

Figure 3:
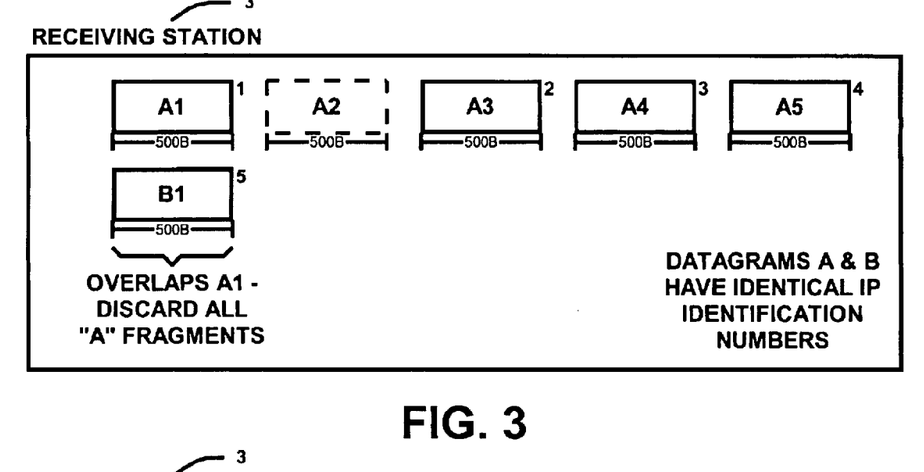
FIG. 3 is a representational view of a receiving station discarding a datagram upon detection of an overlapping data fragment.

FIG. 3 is a representational view of a receiving station discarding a datagram upon detection of an overlapping data fragment.

Briefly, a likelihood of misassembly of data fragments from fragmented IP datagrams is reduced. Data fragments of a datagram having an IP identification number are received. All received data fragments of the datagram are discarded upon detection of receipt of an overlapping data fragment having the IP identification number, wherein the overlapping data fragment overlaps data in an already-received data fragment. Preferably, this technique is performed by an IP layer of a receiving station's communication system.

In more detail, receiving station 3 in FIG. 3 has received data fragments A1, A3, A4 and A5. Data fragment A2 has not been received. Subsequently, data fragment B1 has been received. Datagrams A and B have identical IP identification numbers in FIG. 3, for example as a result of an IP identification number generator wrapping around in a sending station that sent datagrams A and B. Thus, data fragment B1 overlaps data fragment A1. In other words, if data fragment B1 was assembled into a datagram with data fragment A1, some data from one of the data fragments would overlap data from the other data fragment. This overlapping corresponds to a situation where misassembly can occur, for example if a data fragment B2 was subsequently received. In FIG. 3, data fragment B1 overlaps all of data fragment A1.

According to the invention, receiving station 3 determines that data fragment B1 has overlapped data fragment A1. Upon determining that such overlapping has occurred, a receiving station according to the invention discards all received data fragments for the datagram with the overlapped data fragment. In FIG. 3, the datagram with overlapped data fragment A1 is datagram A, so data fragments A1, A3, A4 and A5 are discarded. The invention similarly would have discard all received data fragments for datagram A if another of its data fragments had been overlapped instead of data fragment A1, for example data fragment A3, A4 or A5.

By virtue of the foregoing operation, a sending station discards data fragments before misassembly can occur in some situations.

Figure 4:
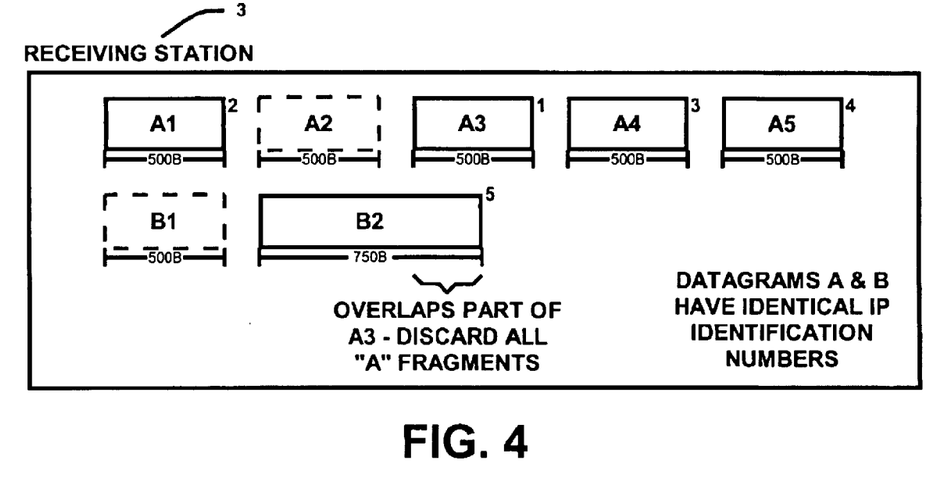
FIG. 4 is a representational view of a receiving station discarding a datagram upon detection of a partially overlapping data fragment.

FIG. 4 is a representational view of a receiving station discarding a datagram upon detection of a partially overlapping data fragment. In FIG. 4, receiving station 3 has received data fragments A1, A3, A4 and A5. Data fragment A2 has not been received. Subsequently, data fragment B2 has been received. Data fragment B2 has a size of 750 bytes, versus the 500 byte size of data fragments A1, A3, A4 and A5. Such a difference in data fragment size can occur, for example, if data fragment B2 traveled across network 2 along a path that had an MTU of 750 bytes, while the rest of the data fragments traveled across network 2 along paths with MTUs of 500 bytes.

Datagrams A and B have identical IP identification numbers in FIG. 4. In this situation, the first 500 bytes of data fragment B2 do not overlap any received data fragments of datagram A. However, the last 250 bytes of data fragment B2 do overlap part of data fragment A3. A receiving station according to the invention preferably would detect this overlap and would therefore discard data fragments A1, A3, A4 and A5. Thus, the invention preferably discards data fragments of a datagram when any data in any of those data fragments is overlapped by any data in a subsequently received data fragment with the same IP identification number.

By virtue of the foregoing operation, a receiving station discards data fragments before misassembly can occur in more situations than if only overlap of entire data fragments was acted upon.

Figure 5:
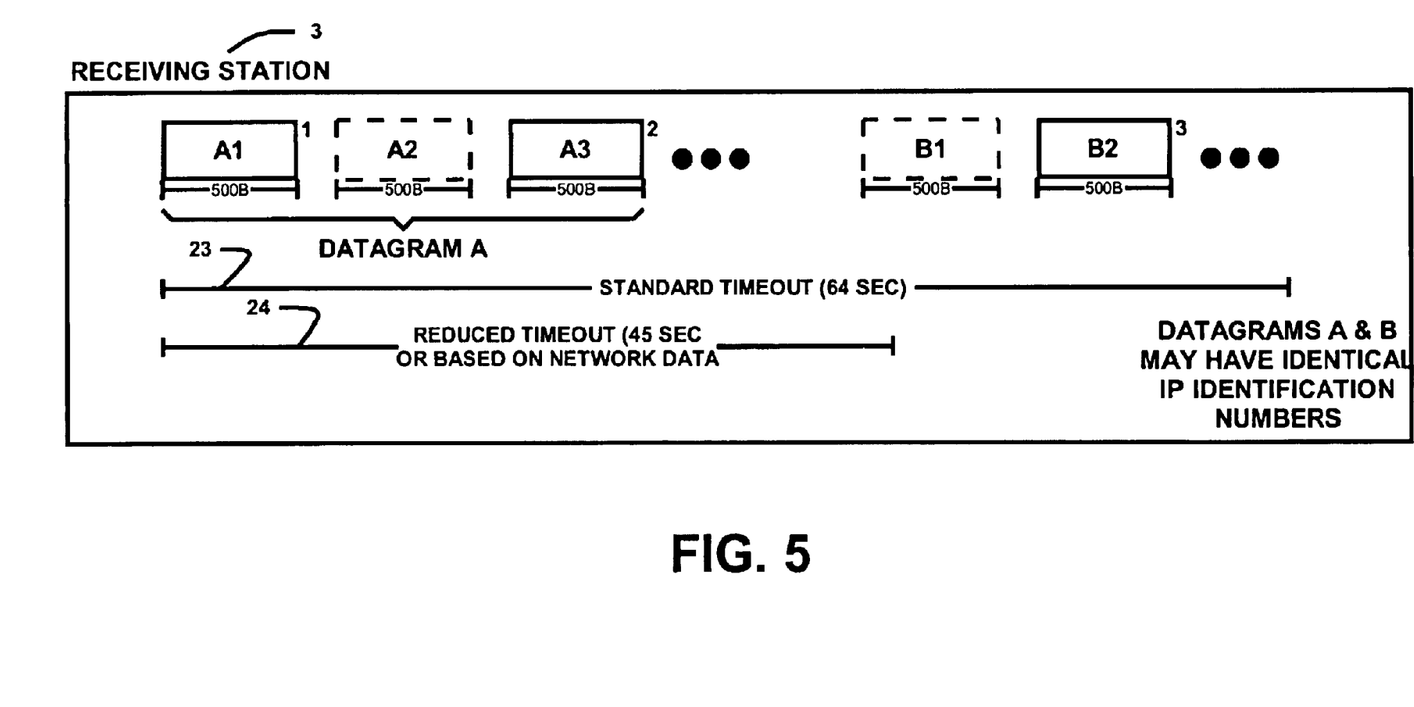
FIG. 5 is a representational view of a reduced timeout for reassembling datagrams at a receiving station.

FIG. 5 is a representational view of a reduced timeout for reassembling datagrams at a receiving station.

Briefly, a likelihood of misassembly of data fragments from fragmented IP datagrams is reduced by reducing a timeout for reassembling the datagrams to less than a standard timeout. Preferably, this technique is performed by an IP layer of a receiving station's communication system.

In more detail, receiving station 3 in FIG. 5 has received data fragments A1 and A3 of datagram A and data fragment B2 of datagram B. Data fragment A2 has not been received. Datagrams A and B have identical IP identification numbers. Accordingly, data fragments A1, B2 and A3 could be misassembled into a corrupted datagram as long as the data fragments were all received before a timeout for datagram reassembly using data fragments A1 and A3.

In FIG. 5, time line 23 illustrates a standard IP datagram assembly timeout of 64 seconds. Data fragment B2 is received within this time frame, so if this standard timeout was used, misassembly could occur. However, a receiving station according to the invention preferably uses a reduced timeout such as that illustrated by time line 24. This timeout ends before receipt of data fragment B2, preventing any chance of misassembly in the example shown in FIG. 5.

A timeout of 45 seconds has been found to produce good result in terms of allowing enough time for proper datagram reassembly while preventing some datagram misassembly. Alternatively, the timeout could be determined based on network data for expected communication (e.g., round-trip) times between a particular sending station and a particular receiving station. Such network data preferably could be provided by an NFS layer of each station's communication system.

Figure 6:
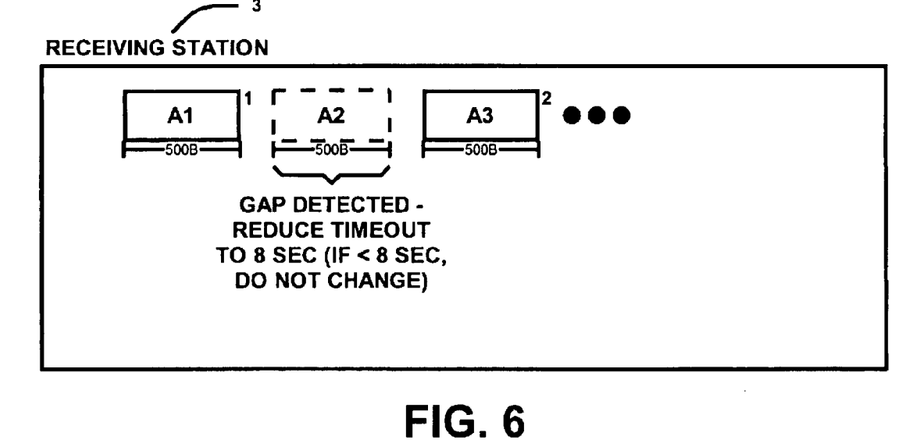
FIG. 6 is a representational view of a receiving station reducing a remaining time for reassembling a datagram upon detection of a gap in received data fragments of the datagram.

FIG. 6 is a representational view of a receiving station reducing a remaining time for reassembling a datagram upon detection of a gap in received data fragments of the datagram.

Briefly, a likelihood of misassembly of data fragments from fragmented IP datagrams is reduced. Data fragments of a datagram having an IP identification number are received. A remaining time for reassembling the datagram is reduced upon detection of a gap in the received data fragments. Preferably, this technique is performed by an IP layer of a receiving station's communication system.

In more detail, receiving station 3 in FIG. 6 has received data fragments A1 and A3 of datagram A. Data fragment A2 has not been received, creating a gap in the received data fragments. The gap can be detected by examining the lengths and offsets included in the headers of the received data fragments. This gap indicates that data fragment A2 might have been lost in transit, opening up the opportunity for a data fragment from another datagram to be improperly inserted into this gap during reassembly. Accordingly, a receiving station according to the invention reduces an amount of time left for receipt of the missing data fragment and reassembly of the datagram.

Reducing the remaining reassembly time to eight seconds in such a situation has been found to produce good results. Eight seconds has been found generally to allow enough time for receipt of a data fragment that has been merely delayed, while generally not allowing enough time for transmission of another datagram with the same IP identification number as the datagram with the gap.

Of course, if the remaining time before timeout is less than eight seconds, only the remaining time is allowed before timeout. In other words, the remaining time is not increased to eight seconds if it is already less than eight seconds.

By virtue of the foregoing operation, fewer opportunities for datagram misassembly tend to occur.

Figure 7:
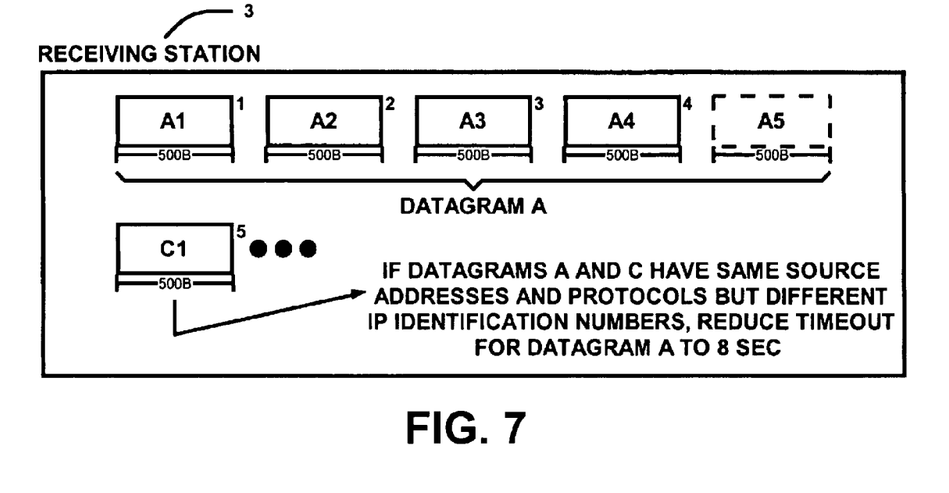
FIG. 7 is a representational view of a receiving station reducing a remaining time for reassembling a datagram upon detection of a data fragment from another datagram having that same source address and protocol as the datagram but a different IP identification number.

FIG. 7 is a representational view of a receiving station reducing a remaining time for reassembling a datagram upon detection of a data fragment from another datagram having that same source address and protocol as the datagram but a different IP identification number.

Briefly, a likelihood of misassembly of data fragments from fragmented IP datagrams is reduced. Data fragments of a first datagram are received, with the datagram having a protocol identification number, a source address, and a first IP identification number. A remaining time for reassembling the first datagram is reduced upon detection, before receipt of a last data fragment of the first datagram, of a data fragment of a second datagram having the protocol identification number and the source address but having a second IP identification number. Preferably, this technique is performed by an IP layer of a receiving station's communication system.

In more detail, one problem with attempting to detect a gap in data fragments is that IP does not provide enough information to directly detect loss of a last data fragment or fragments of a datagram. In particular, IP data fragments indicate if they are or are not a last data fragment. The only indication of relative positions of intermediate IP data fragments are offsets from a start of the datagram. These offsets provide no information about how many data fragments follow a given data fragment. Thus, if a last data fragment of a first datagram is lost, a receiving station only knows that it has received some data fragments of the first datagram but has not yet received a last data fragment. In this situation, the receiving station might receive before timeout a data fragment from another datagram that happens to match the first datagram's IP identification number. This occurrence can lead to misassembly of the first datagram.

Typically, a sending station will send all of a datagram in a particular protocol to a particular receiving station before sending another datagram in that protocol to that receiving station. Thus, possible loss of a last data fragment of a first datagram can be indicated by receipt of a data fragment from a second datagram sent by the same sending station as the first datagram using the same protocol. A receiving station can tell that the data fragment is from the second datagram by checking for a different IP identification number than that used by the first datagram. Accordingly, in order to help prevent misassembly, a sending station can reduce a time remaining for reassembling a datagram upon receipt of a data fragment from another datagram having that same source address and protocol as the datagram but a different IP identification number.

Accordingly, receiving station 3 in FIG. 7 has received data fragments A1, A2, A3 and A4 of datagram A, but not last data fragment A5. Receiving station 3 has no way of knowing if data fragment A5 is a last data fragment of datagram A. Receiving station 3 has subsequently received data fragment C1 of datagram C. Datagrams A and C have different IP identification numbers. Therefore, no overlapping can occur. Also, data fragments from datagram C will not be misassembled with data fragments from datagram A (barring other processing errors).

However, because datagram C shares the same source address and protocol as datagram A, it is likely that the last data fragment or fragments of datagram A have already been sent to receiving station 3 and may be lost. Therefore, receiving station 3 according to the invention preferably reduces a remaining time for receipt of the last data fragment or fragments and reassembly of the datagram. Reducing the remaining time to eight seconds has been found to produce good results, allowing for receipt of merely delayed data fragments while still tending to prevent misassembly.

The foregoing methods are designed to decrease a likelihood of datagram misassembly. Even if misassembly occurs, UDP and other checksums probably will catch most of the misassembled packets. However, a misassembled packet eventually might slip past the checksums, especially if only UDP checksums are used, with possibly dire consequences for data integrity. Thus, the invention also provides techniques for detecting when a likelihood of datagram misassembly is high so that appropriate corrective action can be taken.

Figure 8:
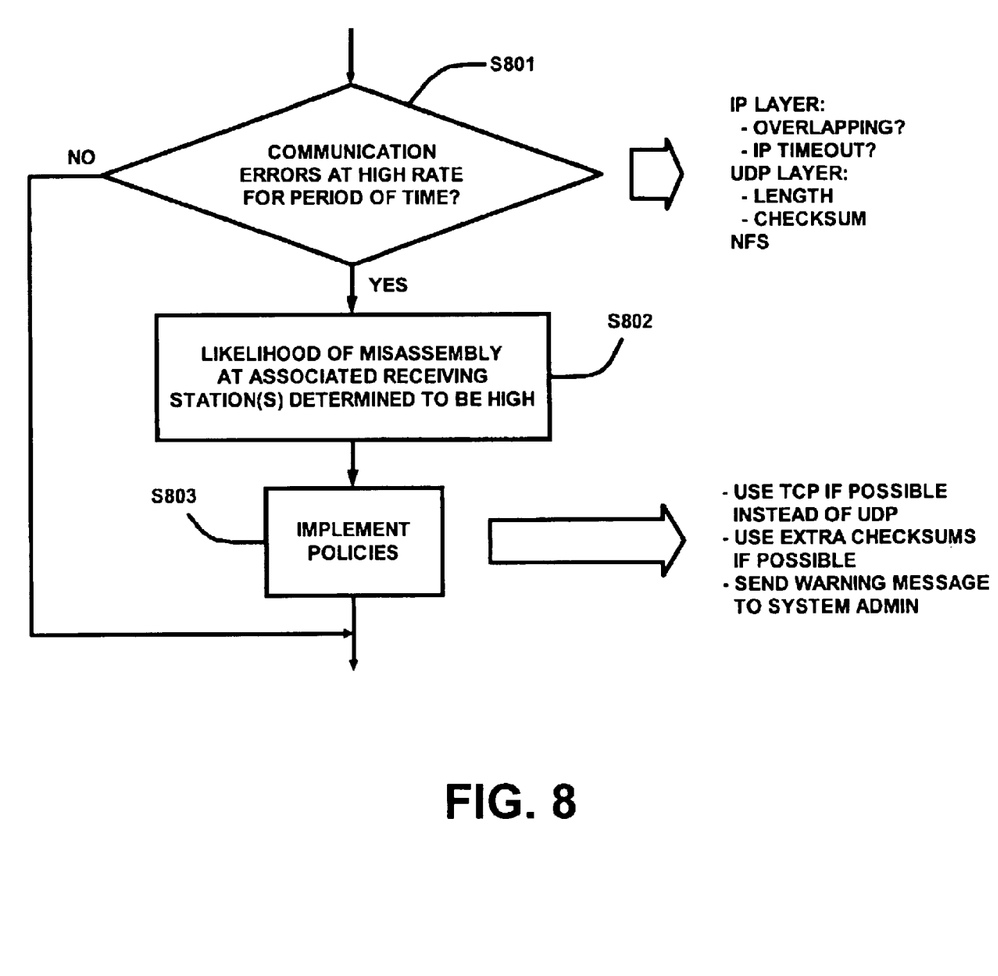
FIG. 8 is a flowchart for explaining determination that a likelihood of misassembly of datagrams is high upon detection of a high rate of communication errors for a period of time.

FIG. 8 is a flowchart for explaining determination that a likelihood of misassembly of datagrams is high upon detection of a high rate of communication errors for a period of time.

Briefly, a likelihood of misassembly of data fragments from fragmented IP datagrams is detected. In order to detect this likelihood, communication errors between a sending station and a receiving station are detected. The likelihood of misassembly is determined to be high upon detection that the communication errors occur at a high rate for a predefined period of time.

In more detail, step S801 in FIG. 8 detects if communication errors are occurring at a high rate for a period of time. This error detection can be performed at a sending station or at a receiving station, both with respect to the station itself and with respect to other stations.

The types of errors indicative of datagram misassembly include IP layer overlapping errors, IP layer timeout, UDP length errors, UDP checksum errors, and NFS errors. Other errors also might be indicative of datagram misassembly.

IP layer overlapping errors can be flagged by a station's IP layer when overlapping occurs as discussed above with respect to FIGS. 3 and 4. Likewise, IP timeout errors can be the result of reduced timeout and reassembly times as discussed above with respect to FIGS. 5, 6 and 7. UDP length and checksum errors can be the direct result of datagram misassembly that is properly caught by UDP error checking mechanisms. NFS errors can be the result of misassembly errors that slipped through the IP and UDP error checking mechanisms. NFS errors can be implied from an increased rate of NFS re-transmissions.

Datagram misassembly and situations that create an opportunity for datagram misassembly have been found to create sustained higher rates of one or more of these types of errors. Thus, if such errors are detected, flow proceeds from step S801 to S802, and it is determined that a likelihood of datagram misassembly at the associated receiving stations is high.

With a high likelihood of datagram misassembly comes an increased chance that a misassembled datagram will pass UDP's weak checksum. Accordingly, flow preferably proceeds from step S802 to step S803, where policies are implemented to decrease the likelihood of datagram misassembly and to increase a likelihood of catching misassembled datagrams.

Examples of the policies implemented in step S803 include using TCP instead of UDP, if possible. TCP avoids reliance upon IP fragmentation. In addition, additional checksums can be used. These additional checksums can include application checksums that are much stronger than those typically used by communication protocols, possibly incorporating extremely strong hashing functions such as MD5 and SH1. If UDP checksumming is turned off, it can be turned on. NFS, application, and/or other checksums can be utilized, if possible. Furthermore, a warning can be sent to the system administrators of both the sending and the receiving stations so that the source of the errors can be tracked down and corrected.

Some of these policies may not be possible to implement in every situation. For example, if a server is implementing the policies, the server may not be able to dictate use of additional checksums to a client. Likewise, TCP may not be available between a particular sending station and a particular receiving station. In these situations, policies preferably are not implemented that prevent communications. Of course, if data integrity is essential, communications with a station that is experiencing high error rates can be discontinued.

Figure 9:
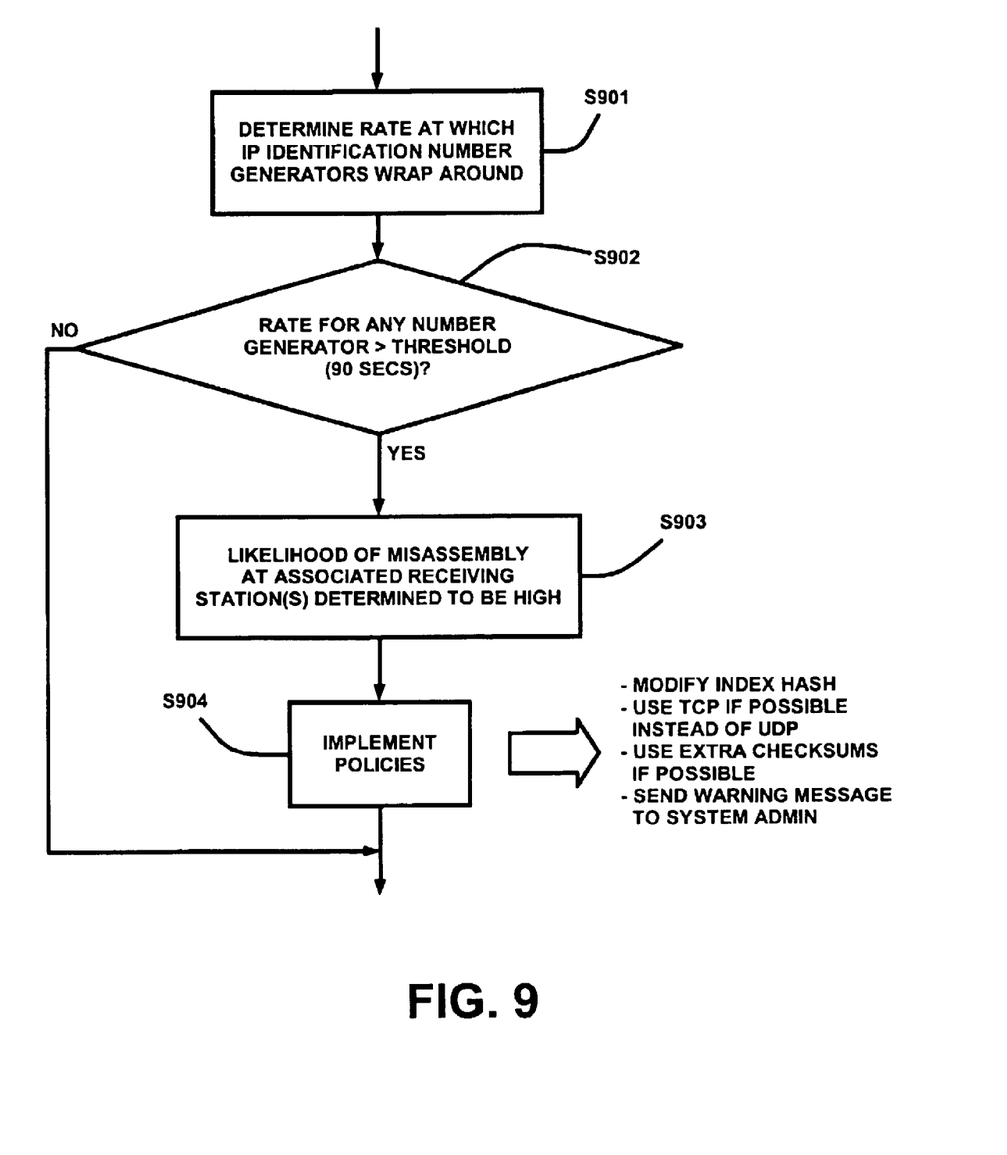
FIG. 9 is a flowchart for explaining determination that a likelihood of misassembly of datagrams is high upon determination that an IP identification number generator wraps around at faster than a predetermined rate.

FIG. 9 is a flowchart for explaining determination that a likelihood of misassembly of datagrams is high upon determination that an IP identification number generator wraps around at faster than a predetermined rate.

Briefly, a sending station detects a likelihood of misassembly of data fragments from fragmented IP datagrams sent to a receiving station. In order to detect this likelihood, the sending station determines a rate at which an IP identification number generator associated with the receiving station wraps around. The likelihood of misassembly at the receiving station is determined to be high upon determination that the IP identification number generator wraps around at faster than a predetermined rate.

In more detail, in step S901 of FIG. 9, a sending station determines a rate at which its IP identification number generator(s) wrap around. In step S902, it is determined if this rate exceeds a predetermined threshold for any particular IP identification number generator. A predetermined threshold of 90 seconds has been found to work well.

If an IP identification number generator wraps around at faster than the predetermined rate, a possibility exists that two datagrams having the same IP identification number will be sent to a receiving station before the first of the two datagrams times out, thereby creating an opportunity for datagram misassembly. Accordingly, if the threshold is exceeded, flow proceeds to step S903. In step S903, it is determined that a likelihood of datagram misassembly at the associated receiving stations is high.

Flow then proceeds to step S904, where policies are implemented to address the high likelihood of datagram misassembly. For example, if the sending station is utilizing plural IP identification number generators, the association between the number generators and the receiving stations can be changed so that fewer receiving stations are associated with the number generator that is wrapping around too quickly. With reference to FIG. 2 above, one technique of changing this association is to change hash 21.

In addition, policies along the lines of those discussed above with respect to step S803 in FIG. 8 also can be implemented. Again, unless data integrity is essential, only those policies that can be implemented without discontinuing communications preferably are implemented.

Alternative Embodiments

Each of the techniques discussed above can be used in conjunction with the others. For example, a sending station can check for communication errors in conjunction with a high rate of IP identification number generator wraparound. Other combinations of the foregoing techniques are possible. Thus, while preferred embodiments of the invention are disclosed herein, many variations are possible which remain within the content, scope and spirit of the invention, and these variations would become clear to those skilled in the art after perusal of this application.

We claim:

1. A method of reducing a likelihood of misassembly of data fragments from fragmented IP datagrams, comprising the steps of:
   receiving data fragments of a datagram having an IP identification number; and
   discarding all received data fragments of the datagram upon detection of receipt of an overlapping data fragment having the IP identification number, wherein the overlapping data fragment overlaps data in an already-received data fragment.

2. A method as in claim 1, wherein the overlapping data fragment overlaps all of the already-received data fragment.

3. A method as in claim 1, wherein the overlapping data fragment overlaps less than all of the already-received data fragment.

4. A method as in claim 1, wherein the steps are performed by an IP layer of a receiving station's communication system.

5. A method of reducing a likelihood of misassembly of data fragments from fragmented IP datagrams, comprising the step of dynamically reducing a timeout for reassembling the datagrams to less than a standard timeout based on NFS data for round-trip times between a sending station and a receiving station.

6. A method as in claim 5, wherein the data fragment reassembly timeout is reduced to 45 seconds from the standard timeout of 64 seconds.

7. A method as in claim 5, wherein the step is performed by an IP layer of a receiving station's communication system.

8. A method of reducing a likelihood of misassembly of data fragments from fragmented IP datagrams, comprising the steps of:
   receiving data fragments of a datagram having an IP identification number; and
   reducing a remaining time for reassembling the datagram upon detection of a gap in the received data fragments.

9. A method as in claim 8, wherein the remaining time for reassembling the datagram is reduced to eight seconds.

10. A method as in claim 8, wherein the steps are performed by an IP layer of a receiving station's communication system.

11. A method of reducing a likelihood of misassembly of data fragments from fragmented IP datagrams, comprising the steps of:
    receiving data fragments of a first datagram having a protocol identification number, a source address, and a first IP identification number; and
    reducing a remaining time for reassembling the first datagram upon detection, before receipt of a last data fragment of the first datagram, of a data fragment of a second datagram having the protocol identification number and the source address but having a second IP identification number.

12. A method as in claim 11, wherein the remaining time for reassembling the first datagram is reduced to eight seconds.

13. A method as in claim 11, wherein the steps are performed by an IP layer of a receiving station's communication system.

* * * * *